US008533853B2

(12) United States Patent
Jones et al.

(10) Patent No.: US 8,533,853 B2
(45) Date of Patent: Sep. 10, 2013

(54) LOCATION SENSITIVE SOLID STATE DRIVE

(75) Inventors: Roydn Jones, Redondo Beach, CA (US); Ken Vancouvering, Torrance, CA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 651 days.

(21) Appl. No.: 12/814,180

(22) Filed: Jun. 11, 2010

(65) Prior Publication Data

US 2011/0138477 A1    Jun. 9, 2011

Related U.S. Application Data

(60) Provisional application No. 61/186,766, filed on Jun. 12, 2009.

(51) Int. Cl.
*G06F 17/30* (2006.01)

(52) U.S. Cl.
USPC .......................................................... 726/27

(58) Field of Classification Search
USPC .......................................................... 726/27
See application file for complete search history.

(56) References Cited

U.S. PATENT DOCUMENTS

| | | | |
|---|---|---|---|
| 4,661,837 A | 4/1987 | Sono | |
| 5,486,720 A | 1/1996 | Kierse | |
| 5,625,230 A | 4/1997 | Park | |
| 5,657,206 A | 8/1997 | Pedersen | |
| 5,675,180 A | 10/1997 | Pedersen | |
| 5,689,135 A | 11/1997 | Ball | |
| 5,889,316 A | 3/1999 | Strobel | |
| 6,124,633 A | 9/2000 | Vindasius | |
| 6,262,362 B1 | 7/2001 | Czjakowski | |
| 6,515,352 B1 | 2/2003 | Spielberger | |
| 6,583,432 B2 | 6/2003 | Featherby | |
| 6,603,072 B1 | 8/2003 | Foster | |
| 6,858,795 B2 | 2/2005 | Czjakowski | |
| 7,020,076 B1 | 3/2006 | Alkalai | |
| 7,092,943 B2 * | 8/2006 | Roese et al. ......................... 1/1 |
| 7,148,084 B2 | 12/2006 | Strobel | |
| 7,191,516 B2 | 3/2007 | Patterson | |
| 7,215,018 B2 | 5/2007 | Vindasius | |
| 7,245,021 B2 | 7/2007 | Vindasius | |
| RE42,927 E | 11/2011 | Want | |
| 2004/0056334 A1 | 3/2004 | Longden | |
| 2005/0011656 A1 | 1/2005 | Patterson | |

(Continued)

FOREIGN PATENT DOCUMENTS

GB            2348573        * 10/2000

OTHER PUBLICATIONS

Strauss, Overview of Radiation Tolerant Unlimited Write Cycle Non-Volatile Memory, In: Proceedings of the IEEE Aerospace Conference, vol. 5, pp. 399-408, 2000.

(Continued)

*Primary Examiner* — Kambiz Zand
*Assistant Examiner* — Aubrey Wyszynski
(74) *Attorney, Agent, or Firm* — William H. Bollman

(57) ABSTRACT

A data storage system including a SSD includes a capability to detect whether its location is acceptable for function, and a capability to self-disable in the event the location of the device is unacceptable, or to self-enable only while the location of the device is acceptable.

25 Claims, 3 Drawing Sheets

(56) References Cited

U.S. PATENT DOCUMENTS

| | | |
|---|---|---|
| 2005/0027409 A1 | 2/2005 | Marshall |
| 2005/0133916 A1 | 6/2005 | Karnezos |
| 2005/0184378 A1 | 8/2005 | Sasaki |
| 2005/0224952 A1 | 10/2005 | Vindasius |
| 2005/0230802 A1 | 10/2005 | Vindasius |
| 2005/0269692 A1 | 12/2005 | Kwon |
| 2006/0102970 A1 | 5/2006 | Butcher |
| 2006/0108620 A1 | 5/2006 | Rizzo |
| 2006/0172462 A1 | 8/2006 | Karnezos |
| 2006/0237823 A1 | 10/2006 | Spielberger |
| 2006/0244117 A1 | 11/2006 | Karnezos |
| 2008/0112300 A1* | 5/2008 | Kumhyr et al. .............. 369/83 |
| 2012/0058814 A1* | 3/2012 | Lutnick et al. .............. 463/25 |

OTHER PUBLICATIONS

International Search Report received in PCT/US2012/00364 dated Oct. 17, 2012.

* cited by examiner

LOCATION SENSITIVE SOLID STATE DRIVE

CROSS-REFERENCE TO RELATED APPLICATION

This application claims priority from R. Jones et al. U.S. Provisional Application No. 61/186,766, titled "Location sensitive solid state drive", which was fled Jun. 12, 2009, and which is hereby incorporated in its entirety by reference herein.

BACKGROUND

This invention relates to data storage and, particularly, to secured data storage in solid state drives.

A solid state drive (SSD) is the non-elecromechanical (that is, "solid-state") equivalent of the rotating, magnetic hard disk drive that is used for storage in almost all computing applications such as desk-top, laptop and notebook computers. The SSD uses non volatile solid-state memory such as flash devices, in place of rotating magnetic memories and therefore has no moving parts. Most SSDs use flash memory because it requires very low power when not being read or written to, and power can be turned off without data loss. Other forms of memory such as DRAM or SRAM require battery back-up to ensure persistence of data.

The typical SSD consists of a microcontroller, memory and some power management circuitry, and may or may not be internally encrypted. The SSD is provided with a standard interface, such as an Advanced Technology Attachment (ATA) interface, including Serial ATA (SATA) and Parallel ATA (PATA) (sometimes referred to as Integrated Drive Electronics (IDE) interface), ATA Packet Interface (ATAPI); a Small Computer System Interface (SCSI) or a Serial Attached SCSI (SAS); a Firewire interface; or a specialized interface for military and aerospace applications.

The conventional rotating disk hard drive is vulnerable to vibration and shock. An SSD can be made as rugged as any other electronic circuit without moving parts, and a principal advantage of the SSD is that it is much more rugged than a rotating hard-drive. In addition the SSD is faster and requires lower power. Disadvantages of SSDs principally include relatively high cost and lower data density. However, the cost per Gbyte for SSD storage is plummeting, and SSDs are now feasible in a greater number of applications. Within a few years, SSDs can be expected to replace magnetic hard disk drives in a large proportion of laptop and notebook computers.

Because of its ruggedness, SSD storage is ideal for deployment in harsh environments, and SSDs are a compelling choice for applications such as military, navy, aerospace, automotives, trains, oil drilling, etc. In these applications ruggedness usually overrides cost at some point so their acceptance here is happening more rapidly.

Data security is a major concern in hard drive data storage. Computers or hard drives may be stolen, or compact disks carrying data may be stolen or lost in transit. Results include misappropriation of proprietary information including technology and corporate strategic plans, invasion of privacy or loss of personal identity, and theft of funds. Data security is extremely important in military and aerospace applications, in homeland security, etc.

SSDs can be encrypted with software keys determined from user entered strings or biometric sources such as a fingerprint reader or retinal scanner.

In many situations sensitive data on the SSD needs to be protected. This is accomplished by either physical destruction of the media or through a secure erase operation. This is a procedure that writes a predefined data pattern over the media repetitively, guaranteeing that the existing data cannot be recovered through any means.

SUMMARY

According to the invention, a geosecure data storage system makes use of an SSD which includes the capability to detect whether its location is acceptable for function, and the capability to self-disable in the event the location of the device is unacceptable, or to self-enable only while the location of the device is acceptable. For example, the device could be set to detect its initial position and to self-disable if it is moved away from the position. Or the device could be set to recognize one or more locations which are acceptable for function, and to self-disable whenever the device is not located within an acceptable position or to self-enable only while the device is located within an acceptable position.

The device could self-disable by simply ceasing the processing of data; or by erasing data in memory so that the data cannot be recovered; or by physical (hardware) self-destruction.

The device can be programmed to activate a data erase function when the device is not located in an acceptable position.

In one general aspect the invention features a data storage system including a SSD, means for sensing the location of the device, means for specifying one or more permitted operation locations, and means for disabling the SSD in the event the sensed location of the device does not fall within a permitted location.

In another general aspect the invention features a data storage system including a SSD, means for sensing the location of the device, means for specifying one or more permitted operation locations, and means for encrypting data in the SSD or for changing an existing encryption of the data in the SSD in the event the sensed location of the device does not fall within a permitted location.

In some embodiments the means for sensing location includes a satellite-based system (Global Navigation Satellite System (GNSS)) receiver such as for example a Global Positioning System (GPS) receiver. The GPS receiver includes a tuned antenna, a receiver-processor, and a clock. A GPS-based device may be preferred for use outside buildings (outdoor use).

In some embodiments the means for sensing location includes a terrestrial radio transmitter-based system receiver such as for example a LOng RAnge Navigation (LORAN) receiver or an Enhanced LORAN (E-LORAN) receiver. A LORAN-based device may be preferred for use inside buildings (indoor use) as well as outdoor use.

In some embodiments the location sensing means continually monitors the location of the device, and the device is programmed to identify one or more permitted operation locations. The device operates only while its actual (sensed) location matches a permitted location. In some embodiments the device self-disables when the actual (sensed) location does not match a permitted location.

In some embodiments where the location sensing means continually monitors the location of the device, and the device is programmed to identify one or more permitted operation locations, data in the device is encrypted, or is re-encrypted when the actual (sensed) location does not match a permitted location.

In some embodiments, in the event the device is powered off (or otherwise not in operation) when moved away from a permitted location, the device can self-disable, or the data can be encrypted or re-encrypted when the device is powered up (or when an attempt is made to bring it into operation) in a nonpermitted location.

In some embodiments the device is programmable to activate a data erase function when the device is located in a nonpermitted location. In some such embodiments the device is programmable (and may be programmed) to activate a fast erase function, or a secure erase function, or a destructive erase function.

In some embodiments the device further includes video front end capability, so that the device can be connected to a source of video input such as a video camera; and the SSD stores video data. Such a Solid State Video Recorder (SSVR) can be employed for image monitoring, for security, etc.

The invention can be used to implement a repository for sensitive material such that security would be compromised if the information fell into the wrong hands. It can also be used for industrial security to ensure corporate secrets remain within the company. In sales transactions it could be used to store sensitive customer information. In medical applications, patient data could be stored without the concern that if computers are stolen the files can be accessed. Laptops containing sensitive data could be moved from one secure location to another (where each location is programmed into the geosecure drive) and ensure that data cannot be accessed in an unsecured area.

DETAILED DESCRIPTION

The invention will now be described in further detail by reference to the drawings, which illustrate alternative embodiments of the invention. The drawings are diagrammatic, showing features of the invention and their relation to other features and structures, and are not made to scale. For improved clarity of presentation, in the FIGS. illustrating embodiments of the invention, elements corresponding to elements shown in other drawings are not all particularly renumbered, although they are all readily identifiable in all the FIGS. Also for clarity of presentation certain features are not shown in the FIGS., where not necessary for an understanding of the invention.

Figure 1:
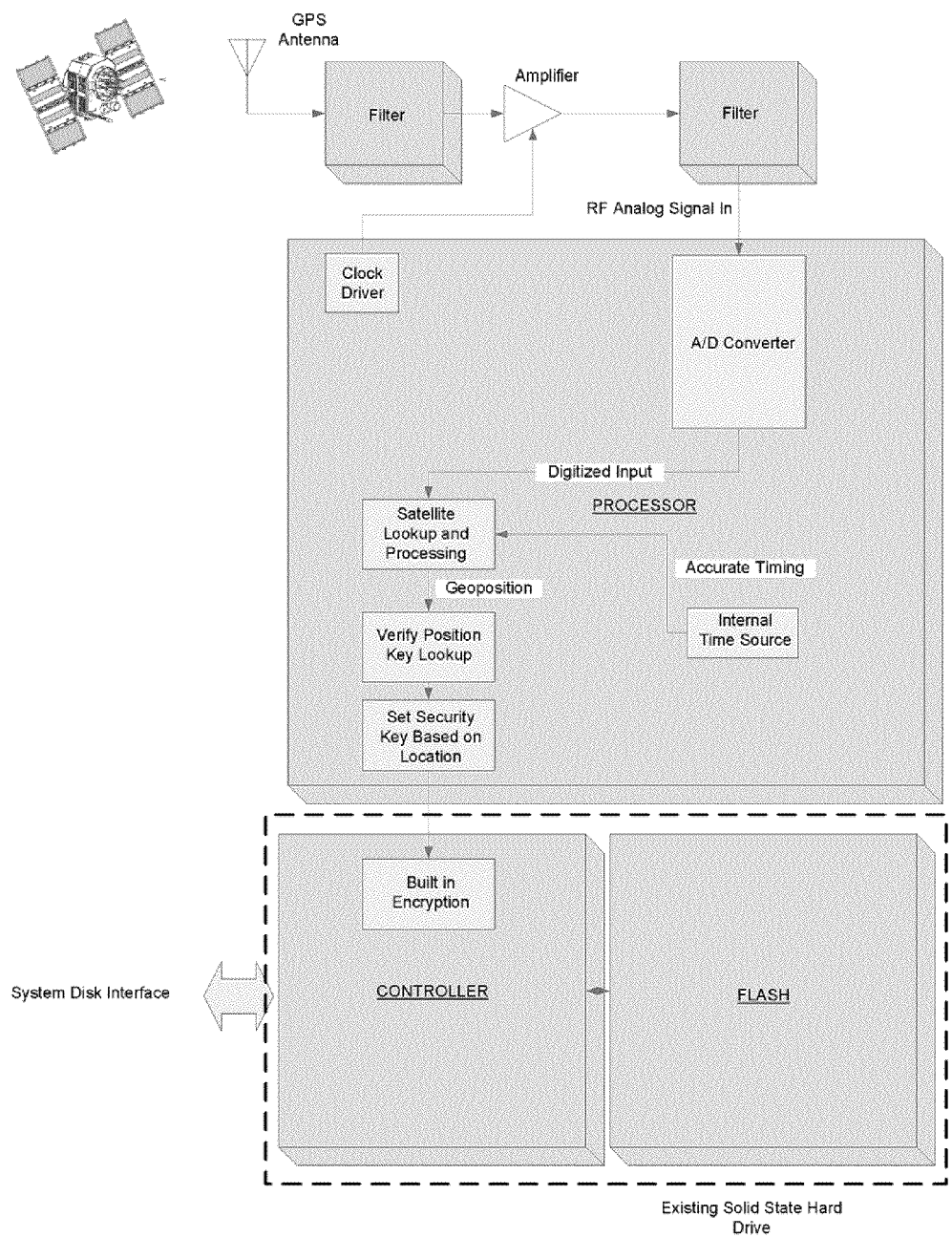
FIG. 1 is a block diagram showing parts of a system according to an embodiment of the invention.

Turning now to FIG. 1, features of a GNSS-based embodiment of the invention are shown in a block diagram showing the relationship of the functions. The SSD ("existing solid state hard drive") itself is shown enclosed by a broken line. It may be a conventional SSD, including a microcontroller, memory and some power management circuitry, and it may or may not be encrypted. It includes a memory (flash memory in this example) and a controller. In this example the controller includes built-in encryption capability. The storage device can include any of a variety of forms of solid-state memory. The SSD includes a System Disk Interface (SDI: PATA/SATA in this example) for connection of the device to the host computer for data transfer.

The SSD can be made in the same footprint as conventional 3.5 inch, 2.5 inch and 1.8 inch drives or it can be in a custom box, or can be added as a module to a PCB, e.g., in single board computers, PC104 boards, and the like. It can alternatively be configured into any "custom" footprint, depending upon the form factor of the device in which it is deployed.

The device in this embodiment also includes a GPS antenna tuned to receive signals from GPS satellites. The GPS signal is first passed through a filter (usually a Surface Acoustic Wave or SAW filter); the filtered signal is then usually amplified by a Low Noise Amplifier (LNA) and is usually passed again through a second filter. The resulting filtered and amplified analog RF signal is then passed to a Digital to Analog Conversion circuit which provides the digitized input signal for satellite determination. The Digital to Analog processing may or may not be embedded in the position processor. The resulting digitized input passes to a Satellite Lookup and Processing function. In this example an internal clock provides accurate time to the lookup and processing function, which establishes the instant geoposition (actual position) of the device. Then the actual position is compared to a list of one or more programmed permitted locations in Position Key Lookup function, which sets a Security Key, based upon whether the actual location matches a permitted location. Where the Security Key Setting indicates a nonmatch, the Controller function of the SSD may be caused to encrypt, or to re-encrypt, or otherwise to become disabled.

Figure 2:
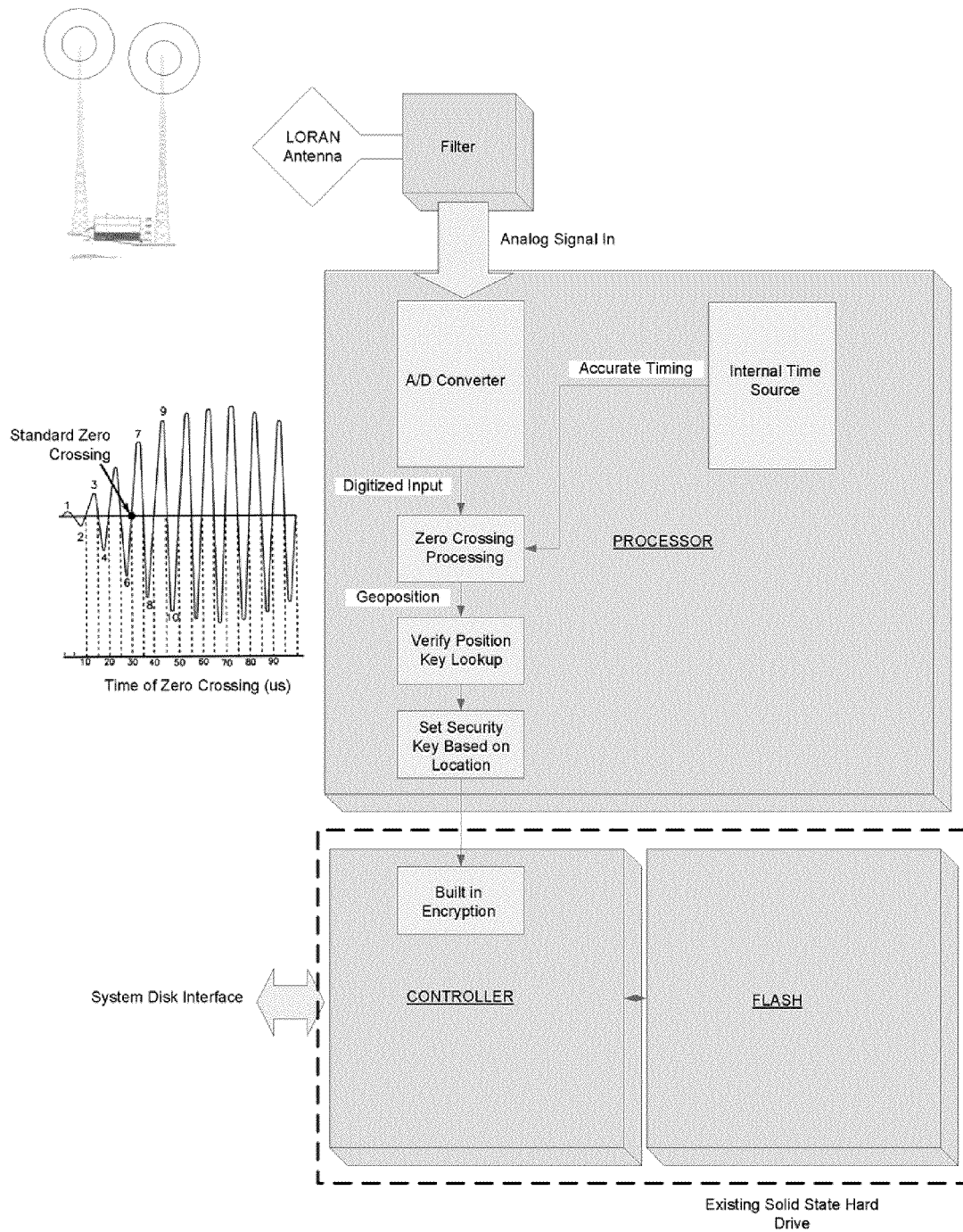
FIG. 2 is a block diagram showing parts of a system according to another embodiment of the invention.

Turning now to FIG. 2, features of a LORAN-based embodiment of the invention are shown in a block diagram showing relationships of functions. The SSD ("existing solid state hard drive") itself is shown enclosed by a broken line. As in the example shown in FIG. 1, it may be a conventional SSD, including a microcontroller, memory and some power management circuitry, and it may or may not be encrypted. It includes a memory (flash memory in this example) and a controller. In this example the controller includes built-in encryption capability. The storage device can include any of a variety of forms of solid-state memory. The SSD includes a System Disk Interface (SDI: PATA/SATA in this example) for connection of the device to the host computer for data transfer.

The SSD can be made in the same footprint as conventional 3.5 inch, 2.5 inch and 1.8 inch drives or it can be in a custom box, or can be added as a module to a PCB, e.g., in single board computers, PC104 boards, and the like. It can alternatively be configured into any "custom" footprint, depending upon the form factor of the device in which it is deployed.

The device in this embodiment also includes a LORAN antenna tuned to receive signals from a set of land-based radio transmitters. The LORAN signal is first electronically filtered to provide a flat frequency response; the resulting filtered analog signal is then passed to an Analog to Digital Converter. This may or may not be a part of the positioning processor. The resulting digitized input passes to a Zero Crossing Processing function. An accurate time source provides timing to the Zero Crossing Processing function, which establishes the instant geoposition (actual position) of the device. The accurate time source may or may not be a part of the positioning processor. The actual position is then compared to a list of one or more programmed permitted locations in Position Key Lookup function, which sets a Security Key, based upon whether the actual location matches a permitted location. Where the Security Key Setting indicates a nonmatch, the Controller function of the SSD may be caused to encrypt, or to re-encrypt, or otherwise to become disabled.

Figure 3:
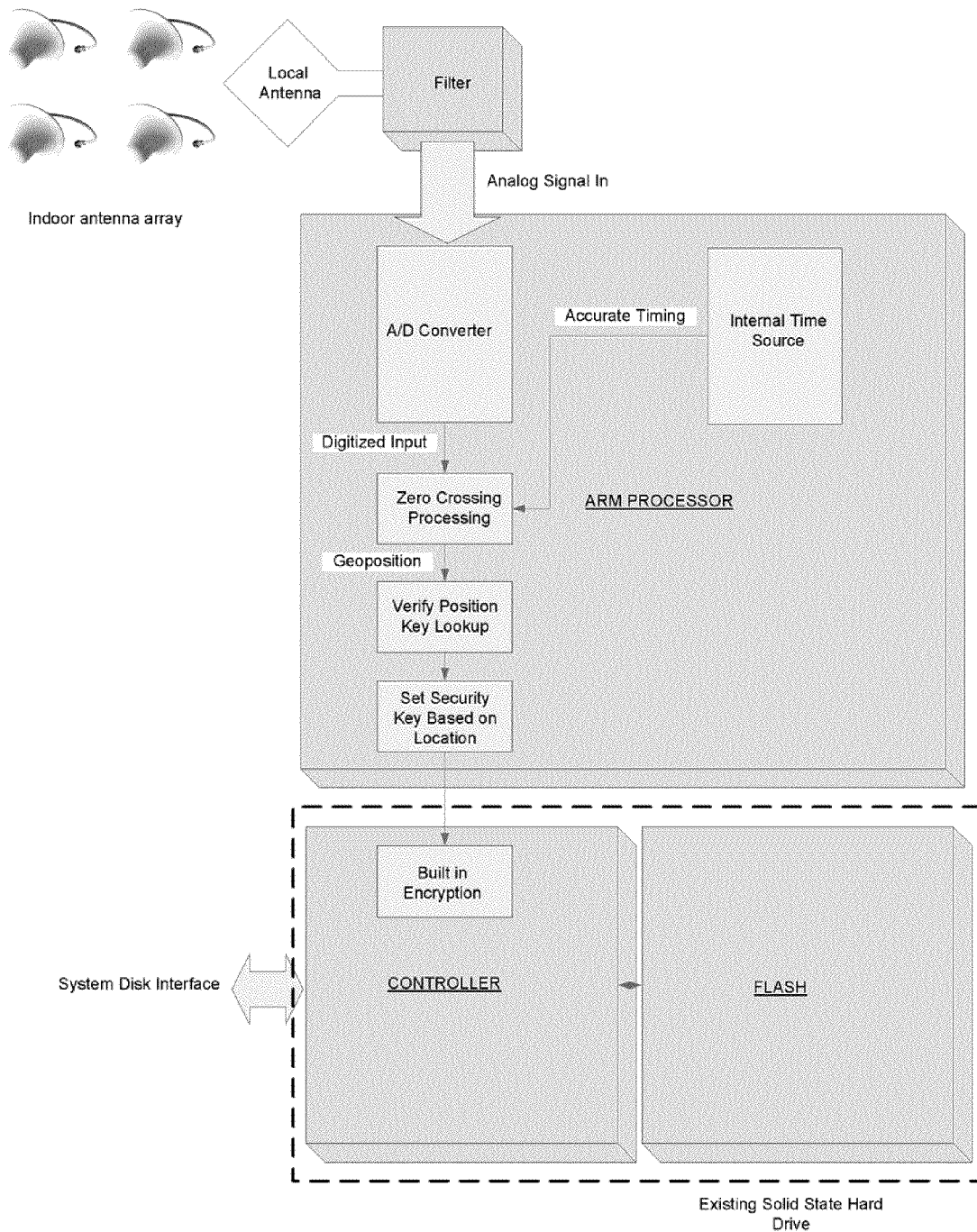
FIG. 3 is a block diagram showing parts of a system according to another embodiment of the invention.

A modification of the above-described LORAN Receiver is shown in FIG. 3. This is similar in concept to the LORAN-based receiver, but is optimized to internal building antenna arrays. These arrays are also used to determine location, but are optimized for operations inside a building that may otherwise contain EMI shielding that would prevent implementation of the embodiments described above. The features of a Local-antenna-based embodiment of the invention are shown in a block diagram showing relationships of functions. The SSD ("existing solid state hard drive") itself is shown enclosed by a broken line. As in the example shown in FIG. 2, it may be a conventional SSD, including a microcontroller, memory and some power management circuitry, and it may or may not be encrypted. It includes a memory (flash memory in this example) and a controller. In this example the controller includes built-in encryption capability. The storage device can include any of a variety of forms of solid-state memory. The SSD includes a System Disk Interface (SDI: PATA/SATA in this example) for connection of the device to the host computer for data transfer.

The SSD can be made in the same footprint as conventional 3.5 inch, 2.5 inch and 1.8 inch drives or it can be in a custom box, or can be added as a module to a PCB, e.g., in single board computers, PC104 boards, and the like. It can alternatively be configured into any "custom" footprint, depending upon the form factor of the device in which it is deployed.

The device in this embodiment also includes an array of intra-building antennas to provide the radio signal broadcasting equivalent of the previous LORAN implementation. Here the geosecure drive antennas are tuned to receive signals from the intra-building broadcasting radio transmitters. This allows finer resolution of position within the building allowing secure operations with detection of even smaller changes in location. Similar to FIG. 2, the received signal is first electronically filtered to provide a flat frequency response; the resulting filtered analog signal is then passed to an Analog to Digital Converter. This may or may not be a part of the positioning processor. The resulting digitized input passes to a Zero Crossing Processing function. An accurate time source provides timing to the Zero Crossing Processing function, which establishes the instant geoposition (actual position) of the device. The accurate time source may or may not be a part of the positioning processor. The actual position is then compared to a list of one or more programmed permitted locations in Position Key Lookup function, which sets a Security Key, based upon whether the actual location matches a permitted location. Where the Security Key Setting indicates a non-match, the Controller function of the SSD may be caused to encrypt, or to re-encrypt, or otherwise to become disabled.

Example 1

The following example lists a set of actions that can be provided by a geosecure solid state drive according to an embodiment of the invention. While these constitute a basic set of functions, this is not a comprehensive list:

Load Key Locations: This function allows the user to set a table of locations where operation is acceptable. In another implementation, the user could set a set of locations where operation is not acceptable.

Read Key Locations: This function reads a table of acceptable functions into the system.

Read Current Location: This function reads the current location from the GPS or LORAN subsystem to determine the acceptability for operation.

Compare Location: This function compares the current location with the pre-entered table of acceptable locations.

Set Key: This function will set the encryption key based on the current location.

Set Encryption Method: This function specifies the current encryption algorithm used by the system to encode data.

Encrypt: This function will encrypt the data using the currently set key and encryption algorithm.

Decrypt: This function will produce the opposite effect of the previous function and will unencrypt the data.

Set Destructive Erase Method: Select the method for destructive erase of sensitive data used for device sanitization.

Example 2

The following example lists types of data erase functions that can be employed in a geosecure solid state drive according to embodiments of the invention. The functions may be employed individually or in combination.

Fast Erase: In a fast erase procedure the solid state drive is erased in parallel operations that result in erase of the drive in a short time, for example less than 1 minute. The erase sequence is sent concurrently to all of the devices. Typically the data are destroyed, but they can be recovered by use of complex analysis equipment (detecting residual charge left on the memory cells following erase). The drive is recoverable, and can be reprogrammed for use.

Secure Erase: A secure erase procedure adds an overwrite to a previous erase procedure (such as a fast erase procedure). The overwrite can be a random or a fixed pattern of data, and can be carried out repeatedly to replace any residual charge on the memory cells with random or meaningless data. The data are, accordingly, nonrecoverable. The drive is recoverable, and can be reprogrammed for use.

Destructive Erase: A destructive erase procedure uses high voltage or some other technique to physically destroy the memory cells and/or read write buffers associated with the solid state drive. The data on the drive is not recoverable following destructive erase, and the drive cannot be reprogrammed for use.

Other embodiments are contemplated within the invention. For example, the device may be provided with a video front end, and coupled to a source of video input such as a video camera. The SSD stores video data, so that the device becomes a location sensitive. Solid State Video Recorder (SSVR). In this embodiment also, moving the drive to another geographically unique location as determined by the GPS or Loran circuit will result in either destruction of the video data therein or in making the data inaccessible to another person through change in encryption key or other concealment mechanism.

In another embodiment the data can be stored and encrypted when the device is in one location and then the key selection can be changed such that the data can be read only in a second location.

We claim:

1. A data storage device, comprising:
   a solid state drive (SSD);
   a location sensor to sense a current location of said solid state drive;
   a selector to select an encryption key based on said current location;
   a disabler to disable said solid state drive when said current location of said solid state drive does not fall within one or more permitted operation locations.

2. The data storage device according to claim 1, wherein: said location information comprises a satellite-based system.

3. The data storage device according to claim 2, wherein: said satellite-based system comprises a global navigation satellite system (GNSS) receiver.

4. The data storage device according to claim 3, wherein:
said satellite-based system comprises a global positioning system (GPS) receiver.

5. The data storage device according to claim 4, wherein:
said GPS receiver includes a tuned antenna, a receiver-processor, and a clock.

6. The data storage device according to claim 1, wherein:
said location sensor comprises a terrestrial radio transmitter-based system receiver.

7. The data storage device according to claim 1, wherein:
said location sensor comprises a long range navigation (LORAN) receiver.

8. The data storage device according to claim 1, wherein:
said location sensor comprises an Enhanced LORAN (E-LORAN) receiver.

9. The data storage device according to claim 1, wherein:
said location sensor continually monitors said current location of said solid state drive; and
wherein said solid state drive is programmed to identify said one or more permitted operation locations; and
wherein said solid state drive operates only while its current location matches a permitted operation location.

10. The data storage device according to claim 1, wherein:
said solid state drive self-disables when said current location does not match any of said one or more permitted operation locations.

11. The data storage device according to claim 1, wherein:
said location sensor continually monitors said current location of said solid state drive.

12. The data storage device according to claim 1, wherein:
said solid state drive is programmed to identify one or more permitted operation locations; and
wherein data in said solid state drive is encrypted when said current location does not match any of said permitted operation locations.

13. The data storage device according to claim 1, wherein:
said solid state drive is programmed to identify said one or more permitted operation locations; and
wherein data in said solid state drive is re-encrypted when said current location does not match any of said one or more permitted operation locations.

14. A device comprising the solid state drive according to claim 1, wherein:
said solid state drive self-disables when an attempt is made to bring said solid state drive into operation in a nonpermitted operation location.

15. A device comprising the solid state drive according to claim 1, wherein:
data on said solid state drive can be encrypted when an attempt is made to bring said solid state drive into operation in a nonpermitted operation location.

16. A device comprising the solid state drive according to claim 1, wherein:
said solid state drive is programmable to activate a data erase function when said solid state drive is located in a nonpermitted operation location.

17. A device comprising the solid state drive according to claim 1, wherein:
said solid state drive is programmable to activate at least one of a fast erase function, a secure erase function, and a destructive erase function.

18. A device comprising the solid state drive according to claim 1, wherein:
said solid state drive further comprising video front end capability, whereby said solid state drive can be connected to a source of video input such as a video camera; and
wherein said solid state drive stores video data.

19. The data storage device according to claim 1, further comprising:
a repository for sensitive information.

20. The data storage device according to claim 19, wherein:
said sensitive information comprises information that is compromised when said sensitive information becomes available to unauthorized persons.

21. The data storage device according to claim 19, wherein:
said sensitive information comprises corporate secrets.

22. The data storage device according to claim 19, wherein:
said sensitive information comprises sensitive customer information.

23. The data storage device according to claim 19, wherein:
said sensitive information comprises medical patient data.

24. The data storage device according to claim 1, wherein:
a portable computing device is comprising of said data storage device.

25. A data storage system, comprising:
a solid state drive;
means for sensing a current location of said solid state drive;
means for selecting an encryption key based on said current location;
means for specifying one or more permitted operation locations; and
means for encrypting data in said solid state drive when said current location of said device does not fall within one or more permitted operation locations.

* * * * *